United States Patent
Sutinen et al.

(10) Patent No.: US 7,386,435 B2
(45) Date of Patent: Jun. 10, 2008

(54) DEVICE FOR TESTING PACKET-SWITCHED CELLULAR RADIO NETWORK

(75) Inventors: Erkka Sutinen, Oulu (FI); Pietari Hyvärinen, Oulu (FI)

(73) Assignee: Validitas Oy, Oulu (FI)

( * ) Notice: Subject to any disclaimer, the term of this patent is extended or adjusted under 35 U.S.C. 154(b) by 563 days.

(21) Appl. No.: 10/503,893

(22) PCT Filed: Feb. 13, 2003

(86) PCT No.: PCT/FI03/00112
§ 371 (c)(1),
(2), (4) Date: Aug. 9, 2004

(87) PCT Pub. No.: WO03/069935
PCT Pub. Date: Aug. 21, 2003

(65) Prior Publication Data
US 2005/0147077 A1    Jul. 7, 2005

(30) Foreign Application Priority Data
Feb. 15, 2002    (FI) ................................ 20020312

(51) Int. Cl.
*G06F 9/44* (2006.01)
(52) U.S. Cl. ................................................. 703/20
(58) Field of Classification Search .................. 703/13, 703/20, 21, 24; 370/349, 328, 477, 338; 455/518, 452.2; 715/735
See application file for complete search history.

(56) References Cited
U.S. PATENT DOCUMENTS

| | | | |
|---|---|---|---|
| 5,794,128 A | 8/1998 | Brockel et al. | |
| 6,011,830 A | 1/2000 | Sasin et al. | |
| 6,097,963 A * | 8/2000 | Boltz et al. | 455/518 |
| 6,128,589 A * | 10/2000 | Lilly | 703/13 |
| 6,272,450 B1 | 8/2001 | Hill et al. | |
| 6,813,280 B2 * | 11/2004 | Vanttinen et al. | 370/477 |
| 6,822,947 B2 * | 11/2004 | Sawyer et al. | 370/328 |
| 6,973,622 B1 * | 12/2005 | Rappaport et al. | 715/735 |

FOREIGN PATENT DOCUMENTS

| | | |
|---|---|---|
| WO | WO 99/52314 A1 | 10/1999 |
| WO | WO 99/66753 A1 | 12/1999 |
| WO | WO 02/51181 A1 | 6/2002 |

OTHER PUBLICATIONS

Cam, H. A Distributed Dynamic Channel and Packet Assignment for Wireless Multimedia Traffic, IEEE Wireless Communications and Networking Conference, vol. 3, Sep. 2000, pp. 1131-1135.*

* cited by examiner

*Primary Examiner*—Russell Frejd
(74) *Attorney, Agent, or Firm*—Oliff & Berridge, PLC (57) ABSTRACT

The invention relates to a device for testing a packet-switched radio network. The device comprises a network traffic simulator for traffic in a radio access network; and a serving general packet radio service GPRS support node simulator connectable to a gateway GPRS support node for coupling the device to a service network. The device is connectable to a control computer for giving commands to the device. For testing packet-switched services, the device is connectable to a test computer, in which a user interface of a service is run on a given platform. A name server is connectable to the device, and a content server via the service network. The device is able to generate billing data records from traffic caused by the packet-switched service.

16 Claims, 11 Drawing Sheets

DEVICE FOR TESTING PACKET-SWITCHED CELLULAR RADIO NETWORK

FIELD

The invention relates to a device for testing a packet-switched cellular radio network.

BACKGROUND

When circuit-switched cellular radio networks are built, the functions of their network elements are tested using various simulators. For example, WO 99/52314 teaches a device for simulating mobile stations, base stations, calls and handovers. The calls are circuit-switched connections. The solution presented mainly tests the operation of a base station controller. The device collects call statistics, handover statistics and error data. U.S. Pat. No. 6,272,450 discloses a cellular network traffic simulator for simulating a base station system, a mobile switching centre, a gateway mobile switching centre, a gateway short message service centre, a visitor location register, a home location register, and a mobile station. According to the publication, the simulator can be connected to a serving GPRS support node of a packet-switched data service, but the publication does not at all deal with the simulation of packet-switched traffic.

Known solutions are not suited to testing packet-switched cellular radio networks. Packet-switched cellular radio networks significantly differ from circuit-switched cellular radio networks in that in a circuit-switched cellular radio network, a call is usually tested that is implemented either between two mobile stations of the cellular radio network or between a mobile station of the cellular radio network and a telephone of an external public switched telephone network (PSTN), whereas in a packet-switched cellular radio network, a packet-switched connection to be tested can be created for instance between a mobile station and a content server connected to the cellular radio network via the Internet, for example.

As the use of packet-switched cellular radio networks increases strongly, there is a growing need in the field for a solution enabling the testing of the operation of the network elements of packet-switched cellular radio networks, the testing of new packet-switched services implemented by the packet-switched cellular radio network and the content servers connected thereto, the testing of terminal applications using the services, and the testing and development of the billing of services.

BRIEF DESCRIPTION

The object of the invention is to provide an improved device for testing a cellular radio network.

An aspect of the invention provides a device for testing a packet-switched cellular radio network, the device comprising a network traffic simulator for traffic in a radio access network, and the device being configured to be connected to a control computer for giving commands to the device; the device further comprising a serving GPRS support node simulator for a packet-switched data service, the simulator being configured to be connected to a gateway GPRS support node for coupling the device to a service network.

The invention is based on using one device to simulate both the radio access network traffic and the operation of the serving GPRS support node of a packet-switched data service.

The device of the invention provides a plurality of advantages. The device enables the testing of the operation of a packet-switched cellular radio network that is being built/expanded, as a whole. In addition, the same device can be used to test the implementation of packet-switched services, the functionality and performance of terminal applications using the services, and the enhancement of billing either in a cellular radio network being built or even in a completed cellular radio network without interfering with the operation serving the actual users of the cellular radio network.

LIST OF THE FIGURES

In the following, the invention will be described in detail in connection with preferred embodiments with reference to the accompanying drawings, in which.

DESCRIPTION OF EMBODIMENTS

The device for testing a packet-switched cellular radio network is usable in various packet-switched cellular radio networks, for instance in what are known as 2.5-generation systems, developed from second-generation mobile systems, and in third-generation systems. Typically, the GSM (Global System for Mobile Communications) represents a second-generation radio system; a GSM-based radio system using the EDGE technology (Enhanced Data Rates for Global Evolution) to increase the data transfer rate and usable also for implanting packet transfer in a packet-switched data service (General Packet Radio System, GPRS) represents a 2.5-generation radio system; and a radio system known at least by the names IMT-2000 (International Mobile Telecommunications 2000) and UMTS (Universal Mobile Telecommunications System) represents a third-generation radio system. However, the embodiments are not restricted to these examples, but a person skilled in the art can also apply the teachings in other cellular radio networks including corresponding characteristics. If required, further information on cellular radio systems is available in trade literature, for instance in *Juha Korhonen: Introduction to 3G Mobile Communications*, Artech House 2001, ISBN 1-58053-287-X, which is incorporated herein by reference.

Figure 1:
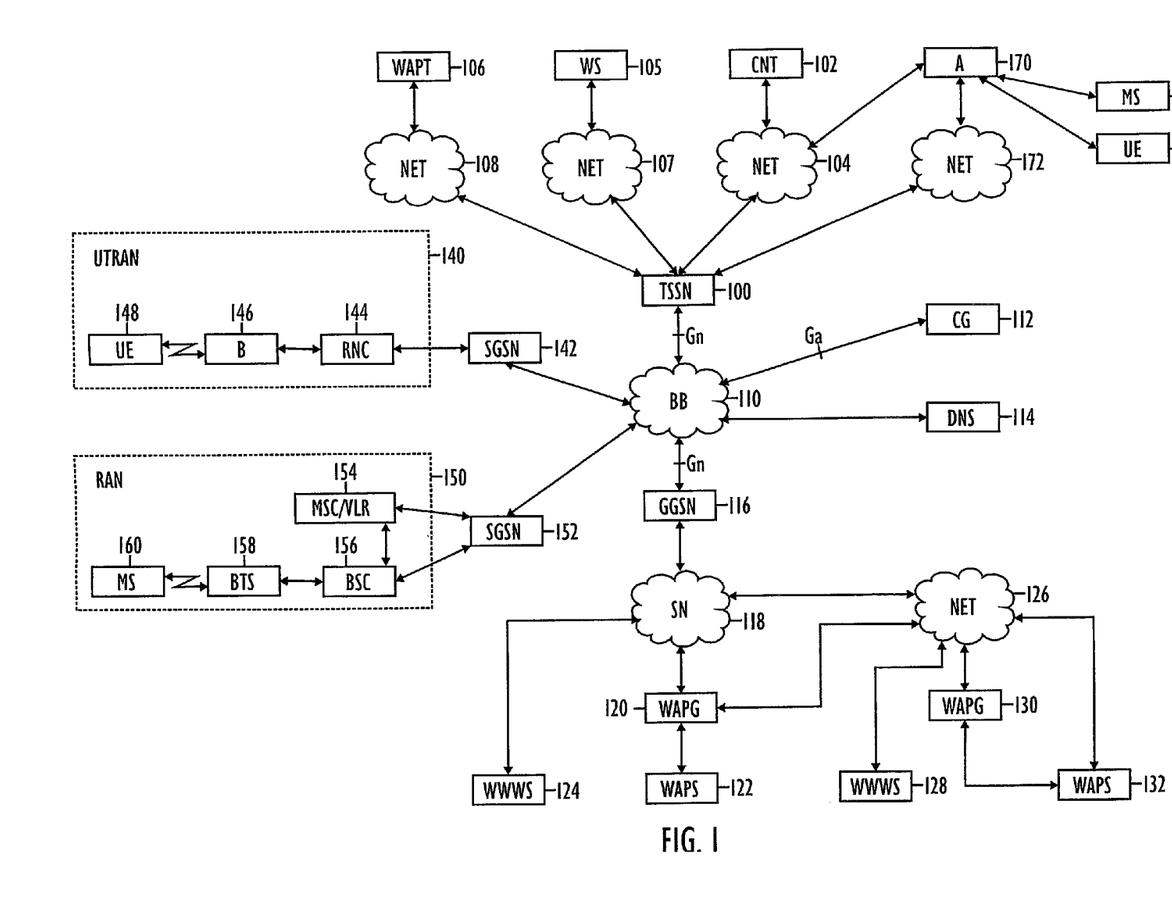
FIG. 1 shows a device for testing a packet-switched network in its operational environment.

FIG. 1 is a simplified block diagram showing the most important parts of a packet-switched radio system at network-element level. The structure of the circuit-switched side is not shown in FIG. 1. The structure and functions of the network elements are not described in detail since they are generally known.

The main parts of a radio system include a core network, a radio access network 140, and user equipment (UE) 148. The term UTRAN is short for UMTS Terrestrial Radio Access Network, i.e. the radio access network 140 belongs to the third generation and is implemented by the wideband code division multiple access (WCDMA) technology. FIG. 1 also shows a 2.5-generation radio access network 150 implemented by the time division multiple access (TDMA) technology.

The structure of the core network corresponds to the combined structure of the GSM and GPRS systems. The GSM network elements are responsible for implementing circuit-switched connections, and the GPRS network elements are responsible for implementing packet-switched connections; however, some network elements belong to both systems.

A mobile services switching centre (MSC) 154 is the centre point of the circuit-switched side of the core network. The mobile services switching centre 154 is also used for packet-switched connections. The tasks of the mobile services switching centre 154 include: connection switching, paging, user equipment location registration, handover management, collection of subscriber billing information, encryption parameter management, frequency allocation management, and echo cancellation.

A home location register (HLR, not shown in FIG. 1) contains a permanent subscriber register, i.e. for instance the following information: an international mobile subscriber identity (IMSI), a mobile subscriber ISDN number (MSISDN), an authentication key, and when the radio system supports GPRS, a packet data protocol (PDP) address. A visitor location register (VLR) 154 contains roaming information on user equipment 160 in the area of the mobile services switching centre 154. The visitor location register 154 contains almost the same information as the home location register, but in the visitor location register 154 the information is kept only temporarily.

Large core networks may have a separate gateway mobile services switching centre (not shown in FIG. 1) for attending to circuit-switched connections between the core network and external networks. The gateway mobile services switching centre is located between the mobile services switching centres and the external networks. An external network can be a public land mobile network (PLMN) or a public switched telephone network (PSTN), for instance.

A serving GPRS support node (SGSN) 142, 152 is the centre point of the packet-switched side of the core network. The main task of the serving GPRS support node 142, 152 is to transmit and receive packets with the user equipment 148, 160 supporting packet-switched transmission by using the radio access network 140, 150. The serving GPRS support node 142, 152 contains subscriber and location information related to the user equipment 148, 160.

A gateway GPRS support node (GGSN) 116 is the packet-switched side counterpart of the gateway mobile services switching centre of the circuit-switched side with the exception, however, that the gateway GPRS support node 116 must also be capable of routing traffic from the core network to the external networks, whereas the gateway mobile services switching centre only routes incoming traffic.

The radio access network comprises 150 a base station controller (BSC) 156 and base transceiver stations (BTS) 158. The base station controller 156 controls the base transceiver station 158. In principle, the aim is that the devices and the related functions for implementing the radio path reside at the base transceiver station 158, and the management devices in the base station controller 156.

The base station controller 156 attends for instance to the following tasks: radio resource management of the base transceiver station 158, intercell handovers, frequency control, i.e. frequency allocation to the base transceiver stations 158, management of frequency hopping sequences, uplink time delay measurement, implementation of the operation and maintenance interface, and power control.

The base transceiver station 158 comprises at least one transceiver implementing one carrier, i.e. eight time slots, i.e. eight physical channels. Typically, one base transceiver station 158 serves one cell, but a solution is feasible wherein one base transceiver station 158 serves several sectored cells. The diameter of a cell may vary from a few meters to tens of kilometres. The tasks of the base transceiver station 158 include for instance: calculation of timing advance (TA), uplink measurements, channel coding, encryption, decryption, and frequency hopping.

The radio access network 140 is composed of a radio network controller (RNC) 144 and nodes B 146. Node B is quite an abstract concept, and often the term base transceiver station is used instead. The functionality of the radio network controller 144 corresponds approximately to that of the base station controller 156, and node B 146 to base transceiver station 158. Solutions are also available, wherein the same device serves as both the base station and node B, i.e. said device can be used to simultaneously implement the TDMA and WCDMA radio interface.

The user equipment 148 comprises two parts: mobile equipment (ME) and a UMTS subscriber identity module (USIM). The GSM system naturally uses a SIM of the GSM system. The user equipment 148 comprises at least one transceiver for establishing a radio link to the base transceiver station 146, 158. The user equipment 148 may comprise at least two different subscriber identity modules. In addition, the user equipment 148 contains an antenna, a user interface and a battery. Nowadays, there are different types of user equipment 148, 160, for instance vehicle-mounted and portable. Properties better known from personal or portable computers have also been implemented in the user equipment 148, 160. The USIM comprises user-related information, and information relating particularly to information security, e.g. an encryption algorithm.

FIG. 1 also shows the interfaces between the network elements that are interesting to our study, i.e. a Gn interface between the serving GPRS support node 142, 152 and the gateway GPRS support node 116, and a Ga interface between the serving GPRS support node 142, 152 and a billing gateway 112, to be described later. The object is a cellular radio network where the network elements of different manufacturers are able to cooperate with each other well enough for an operating cellular radio network to be created. However, in practice, part of the interfaces may be manufacturer-dependent.

In a third-generation radio system, a device 100 for testing a packet-switched cellular radio network may replace the radio access network 140, 150 and the serving GPRS support node 142 of the network in such a manner that a simulation program 106 of a wireless terminal is connected to services provided over a core network 110 of the packet-switched network in exactly the same way as a real third-generation wireless terminal 148. Below, the device 100 for testing a packet-switched cellular radio network will be called a simulator 100 for the sake of clarity. In the figures, the simulator 100 is denoted by the abbreviation TSSN (Transmission Simulation Support Node). The simulator 100 is connected in parallel with an existing serving GPRS support node 142 at the Gn interface.

In a 2.5-generation radio system using packet-switched data service, the simulator 100 may replace the radio access network 150 and the serving GPRS support node (SGSN) 152 in such a way that the simulation program 106 of the wireless terminal is connected to services provided over the core network 110 of the packet-switched network in the same way as a real wireless terminal 160. The simulator 100 is connected in parallel with an existing serving GPRS support node 152 at the Gn interface.

The simulator 100 supports all the same connection set-up protocols over the core network 110 of the packet-switched network as the third-generation wireless packet-switched network and the 2.5-generation wireless packet-switched data service. Consequently, the connection set-up protocol may be for instance GTP (GPRS Tunnelling Protocol).

The simulator 100 can be contacted over a maintenance network 104, 107, 108 using the simulation program 106 of the wireless terminal, a workstation 105 or a control computer 102. The simulator 100 can be configured to enable the connection of the control computer 102 thereto via the Internet, a private network or a virtual private network.

The control computer 102 configures the simulator 100 using a suitable protocol with over the operator's maintenance network 104. The protocol may be for instance HTML (Hypertext Markup Language) or XML (Extensible Markup Language).

In a third-generation wireless packet-switched network, the simulator 100 may test the elements of the core network 110 of the network, such as the gateway GPRS support node 116 and a domain name server (DNS) 114. The simulator 100 may also be used to develop and monitor the billing system of a third-generation wireless packet-switched network, e.g. the UMTS, by transmission of billing data records generated by the simulator 100 to the billing gateway 112. In some systems, the abbreviation CDR (Call Detail Record) is used for billing data records. The simulator 100 is configured to generate billing data records from the traffic caused by a packet-switched service analogously to a real situation. For instance, in the simulation of a packet-switched data service, the billing data records are created in accordance with specification GSM 12.15 of the ETSI (European Telecommunications Standards Institute), incorporated herein by reference.

In a 2.5-generation radio system using a packet-switched data service, the simulator 100 may test the elements of the core network 110 of the network, such as the gateway GPRS support node 116 and the domain name server 114. The simulator 100 may also be used to develop and monitor the billing system of the packet-switched data service by transmission of billing data records (CDR) generated by the simulator 100 to the billing gateway 112.

The simulation program 106 of a wireless terminal can be used to make contact to an operator's wireless application protocol (WAP) gateway 120 through the simulator 100 via the core network 110 of the network and a service network 118, and via the WAP gateway 120 to services provided by a WAP server 122. The simulation program 106 of the wireless terminal can also be used to make contact, through the simulator 100, over the core network 110 of the network, via the operator's WAP gateway 120 and a network 126, to services provided by the WAP server 122. In our example, the network 126 is the Internet, but it may also be Intranet or another communication network. The simulation program 106 of the wireless terminal can also be used to make contact through the simulator 100 via the core network 110 of the network to services located behind the operator's WAP gateway 130 behind the Internet 126 and provided by a WAP server 132.

Internet services can be tested at the workstation 105 via the simulator 100 by contacting Internet services 124 behind the service network 118 via the core network 110 of the network. Internet services can be tested at the workstation 105 via the simulator 100 by contacting Internet services 124 behind the service network 118 via the core network 110 of the network, the services being provided by means of a virtual private network (VPN). Internet services can also be tested at the workstation 105 via the simulator 100 by contacting Internet services 128 behind the Internet 126 via the core network 110 of the network and the service network 118.

Figure 2:
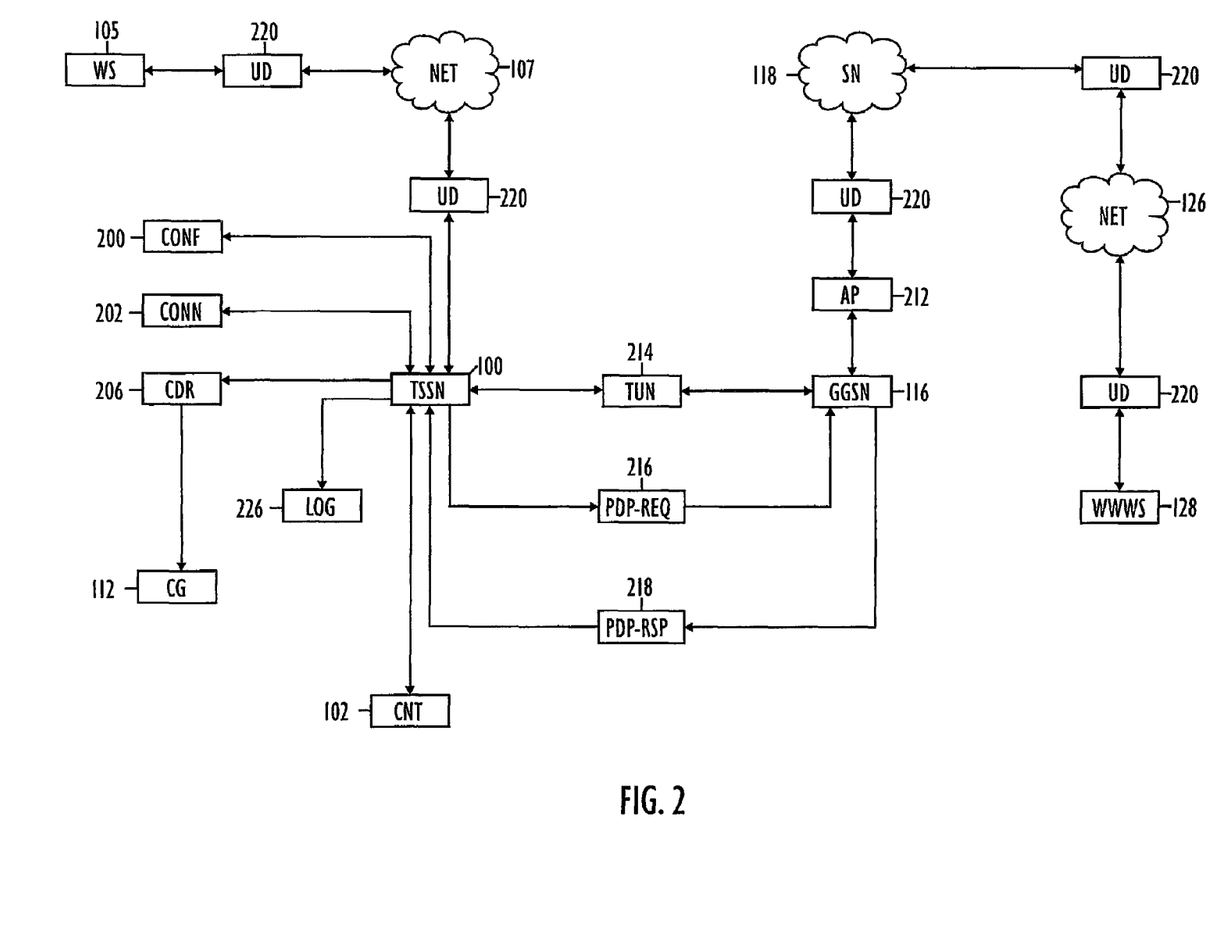
FIG. 2 is a simplified block diagram of the external interfaces and the operation of the device.

The external interfaces and operation of the simulator 100 will be illustrated next with reference to FIG. 2. The simulator 100 is configured by using the control computer 102. Configuration information is stored in a configuration data storage 200. The configuration information is loaded from the configuration data storage 200 upon start-up of the simulator 100. Connection information is generated from the connections set up via the simulator 100 and stored in a connection data storage 202. All user data going though the simulator 100 is used to generate billing records 206 that are transmitted to the billing gateway 112. Event data 226 is stored regarding all functions of the simulator 100.

The workstation 105 transmits packet-form user data 220 over the maintenance network 107 to the simulator 100. When the first user data 220 packet arrives at the simulator 100, the simulator 100 transmits a packet-form data transmission request 216 to the gateway GPRS support node 116. The gateway GPRS support node 116 replies to the packet-form data transmission request by a response 218, after which the simulator 100 encapsulates the user data 220 into a suitable protocol form and transmits it via a generated data tunnel 214 to the gateway GPRS support node 116. The gateway GPRS support node 116 directs the user data 220 to the correct access point 212. The access point 212 transmits the user data 220 over the serving network 118 and the Internet 126 to a content server 128 that responds to the user data 220 requests.

Figure 3:
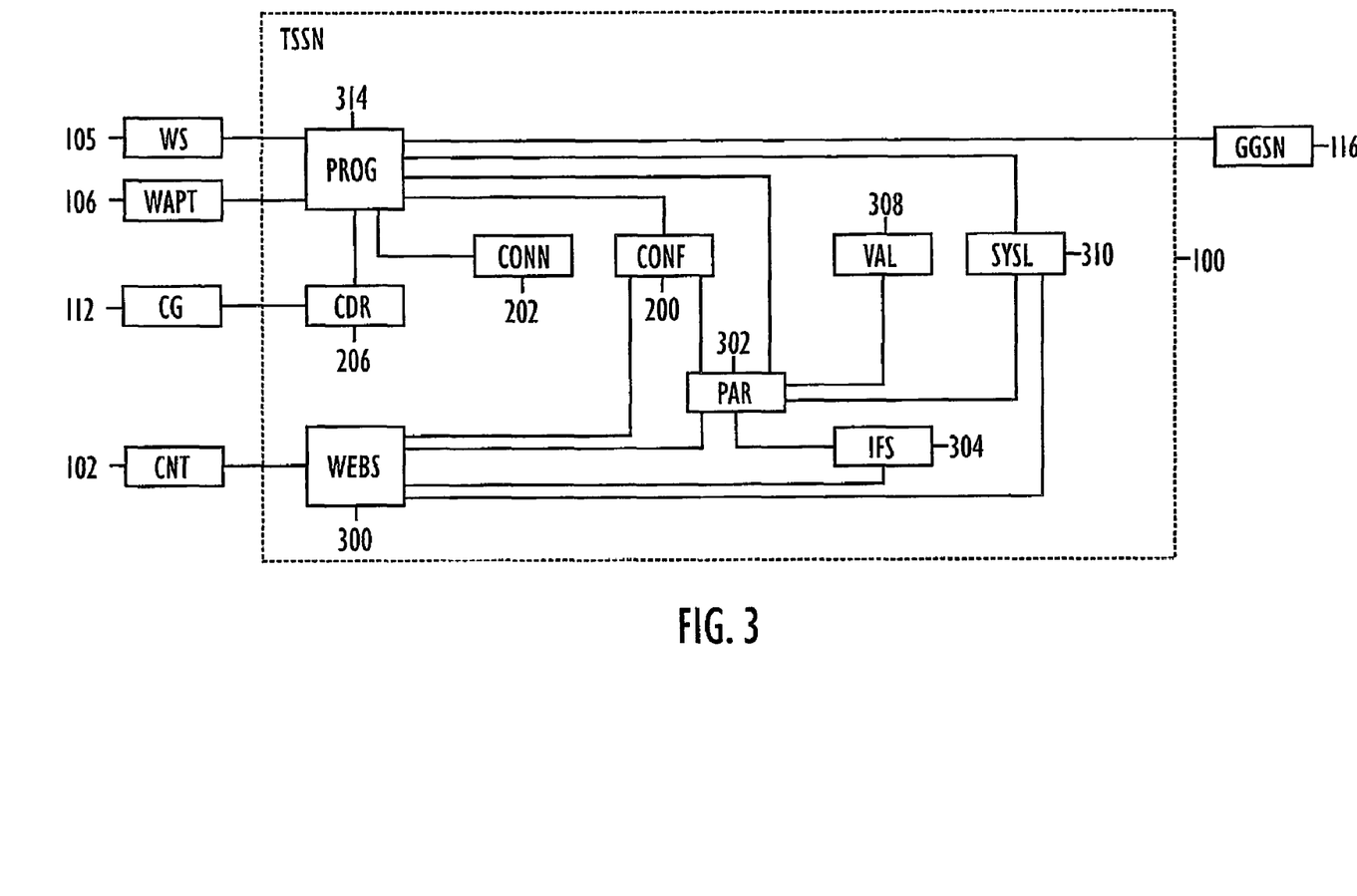
FIG. 3 is a simplified block diagram of the internal structure and operation of the device.

The internal structure and operation of the simulator 100 is illustrated with reference to FIG. 3. The simulator 100 comprises a real-time core 314, which runs the processes controlling and timing the operation of the device. The real-time core 314 is connectable to the gateway GPRS support node 116. The operation of the simulator 100 is controlled with the control computer 102, which is used to set up a connection to a www server 300 inside the simulator 100. The internal www server 300 retrieves the basic data required to control the operation from an interface process 304 and operating instructions storage 200. After the internal www server 300 has retrieved the information required for controlling the operation, the control computer 102 is able to make the necessary amendments to the data or create new control records for controlling the operation of the simulator 100. The basic data required for controlling the operation and retrieved from the interface process 304 and the operating instructions storage 200 remains in the possession of the www server 300 at all times, and is not stored in the control computer 102. However, the control computer 102 can be used to view, edit and create control data required for controlling the operation. Once the desired amendments are made and they are to be stored, the internal www server 300 forwards the control data to an internal control data assembler 302, which checks that the new control data is in the correct format by using a control data checker 308. If the control data checker 308 detects an error in the control data, information thereon is returned to the control computer 102. After checking the control data, the control data assembler 302 stores the control data in the operating instructions storage 200. The real-time core 314 stores connection data in the connection data storage 202 regarding all connections set up through the simulator 100. Conceptually, the simulator 100 comprises a separate network traffic simulator and a packet-switched data service serving GPRS support node simulator, but they can be implemented for instance as different processes of the real-time core 314 or as different functions of the same process, and the data thereon can be stored in the internal www server. The network traffic simulator can be configured to simulate the effect of different interference and malfunction in the radio channel on the traffic caused by the packet-switched service. Furthermore, the network traffic simulator can be configured to simulate the effect of a change in the data transfer capacity of the radio channel on the traffic caused by the packet-switched service.

The control computer 102 is used to select and activate active control data for controlling the operation of the simulator 100. The internal www server 300 transfers the selection of the control computer 102 to the control data assembler 302, which requests the simulator 100 to restart and take the desired active control data into use.

The simulator 100 generates billing data records 206 from the traffic passing through the simulator 100 and the records are forwarded to the billing gateway 112 along the Ga interface.

Event data are collected from the real-time core 314, internal www server 300 and the control data assembler 302, and stored in an event data storage 310.

Consequently, the simulator 100 can be implemented as one or more processors with software, for instance as a normal general-purpose computer with the necessary components and interfaces, but also various hardware implementations are feasible, e.g. a circuit built from separate logics components or one or more application-specific integrated circuits (ASIC). A hybrid of these implementations is also feasible. The structures and functionalities described can thus be implemented for instance as program modules and/or ASIC blocks. When selecting the implementation, a person skilled in the art will pay attention for instance to the requirements set on the size and power consumption of the device, the required processing power, manufacturing costs and production volumes. The parts related to the simulator 100, i.e. the control computer 102 and the test computer 106, are configured to be connected to the simulator 100. This refers to the integration level of the simulator 100 and the parts 102, 106 related thereto. The simulator 100 and the parts 102, 106 can be separate, allowing them to be connected to a data transfer connection with each other by using cables and communication networks, for example. The simulator 100 may also comprise the control computer 102 and/or the test computer 106. In this case, the parts 102, 106 are connected to the simulator 100 for instance by inter-process communication mechanisms, such as by message transmission from one processor to another, or by the use of inter-program-module communication mechanisms, such as subprogram calls. The above is also true of the workstation 105, i.e. it, too, can be integrated into the simulator 100, if desired.

Figure 4:
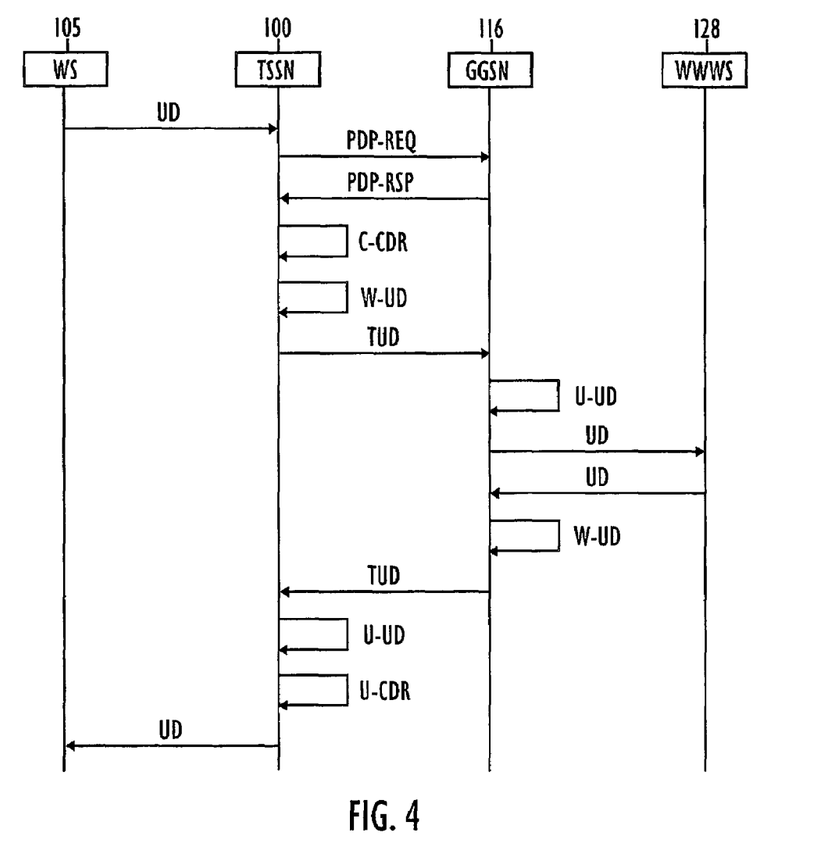
FIG. 4 is a simplified signal sequence diagram illustrating the operation of the device in testing services.

A simplified signal sequence diagram illustrating the operation of the simulator 100 in testing services is described with reference to FIG. 4. The workstation 105 transmits packet-form user data UD over the maintenance network to the simulator 100. Upon arrival of the first user data packet UD to the simulator 100, the simulator 100 transmits a packet-form data transfer request PDP-REQ to the gateway GPRS support node 116. The gateway GPRS support node 116 responds to the packet-form data transfer request by a response PDP-RSP, whereupon the simulator 100 generates a billing record C-CDR from the established connection. The simulator 100 then encapsulates the user data into a suitable protocol form W-UD and transmits it TUD via a created data tunnel to the gateway GPRS support node 116. The gateway GPRS support node 116 performs decapsulation U-UD and directs the user data UD via the correct access point over the serving network and the Internet to the content server 128. The content server 128 transmits a reply UD to the gateway GPRS support node 116, which encapsulates the user data into a suitable protocol form W-UD and transmits it TUD along a created data tunnel to the simulator 100. The simulator 100 performs encapsulation U-UD and updates the billing record U-CDR on the basis of the transferred data. The simulator 100 then transmits the obtained response UD to the workstation 105.

Figure 5:
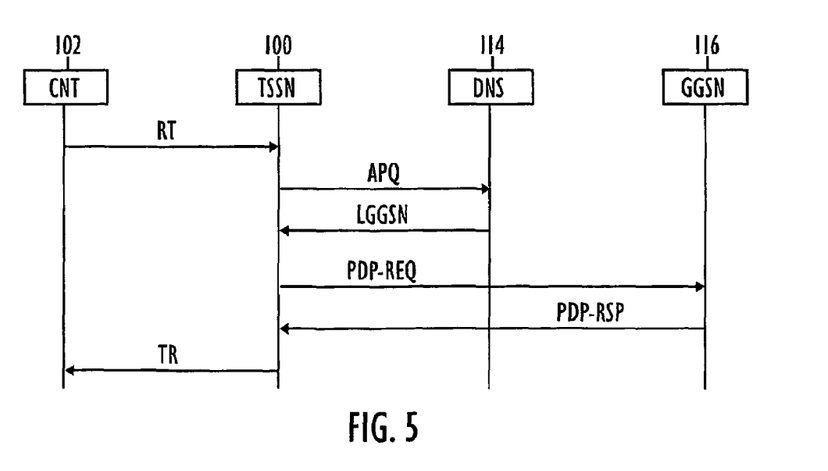
FIG. 5 is a simplified signal sequence diagram illustrating the operation of the device in testing network operation.

Next, the operation of the simulator 100 for testing network operation is illustrated by means of the signal sequence diagram of FIG. 5. The control computer 102 transmits a test request RT with the necessary test parameters over the maintenance network to the simulator 100. The simulator 100 transmits an access point request APQ to the name server 114. As a response, the name server 114 transmits data LGGSN on the gateway GPRS support nodes 116 found. The simulator 100 transmits a packet-form data transfer request PDP-REQ to each gateway GPRS support node 116 found. Each gateway GPRS support node 116 responds by a packet-form data transfer request response PDP-RSP. The simulator 100 then transmits a response TR regarding the test results to the control computer 102.

Figure 6:
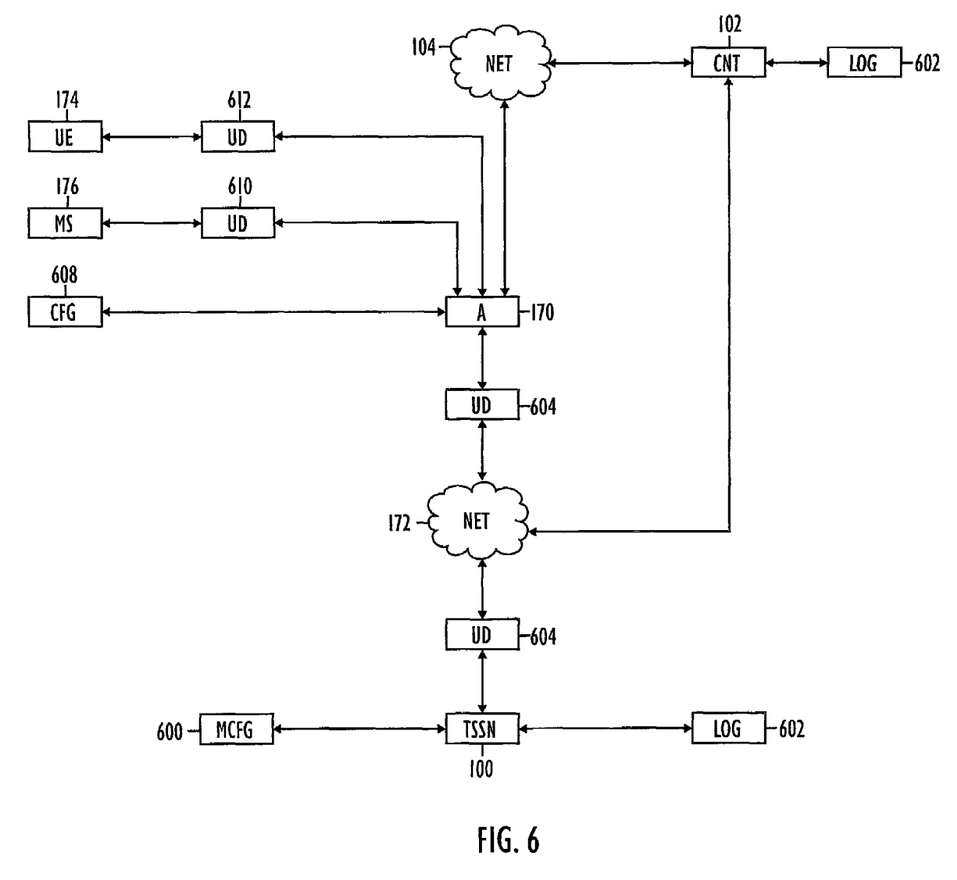
FIG. 6 shows the use of an adapter to connect the device to a subscriber terminal.

FIG. 1 also shows an embodiment where the simulator 100 is, for testing packet-switched applications and services, configured to be connected to a subscriber terminal 174, 176, wherein the service user interface is run on a given platform, via an adapter 170. FIG. 6 shows more exactly the use of the adapter 170 for connecting the subscriber terminal 174, 176 to the simulator 100. The adapter 170 can be connected to the device at least via a testing network, which can be for instance the Internet, a private network or a virtual private network. The adapter 170 is configured using the control computer 102. The configuration can be stored either in the simulator 100 or in the adapter 170. The wireless terminal 174, 176 can be used to set up a connection, by using the adapter 170, through the simulator 100 along the core network 110 of the network to servers 122, 124, 128, 132 behind the gateway GPRS support node 116 in the manners shown in FIG. 1 and described above, for instance for testing WAP services and Internet services. When a secured protocol is used, the adapter 170 may also serve as the proxy server when a connection is set up from the control computer 102 or some other workstation via the adapter 170 over the local network 104 or the testing network 172 or some other network(s) to the simulator 100.

Thus, configuration data 600, 608 comprised by the configuration is stored in the simulator 100 or the adapter 170. If the configuration data 600 is stored in the simulator 100, then part of the configuration data 608 is stored in the adapter 170, by means of which the adapter 170 is able to automatically load the rest of the configuration data 600 upon start-up. All configuration data 608 can also be stored only in the adapter 170. The adapter 170 generates data 602 about its operation, which data is stored in the simulator 100 and readable at the control computer 102.

The terminal 174, 176 used transmits packet-switched or circuit-switched data 610, 612 over the air interface to the adapter 170, which converts all data into packet-form user data 604 and transmits it to the simulator 100 over the telecommunication network 172. In the adapter 170, the packet-form user data 604 transmitted by the simulator 100 is converted into a form according to the configuration 608 into packet-switched or circuit-switched data 610, 612 and transmitted further to the terminal 174, 176.

Figure 7:
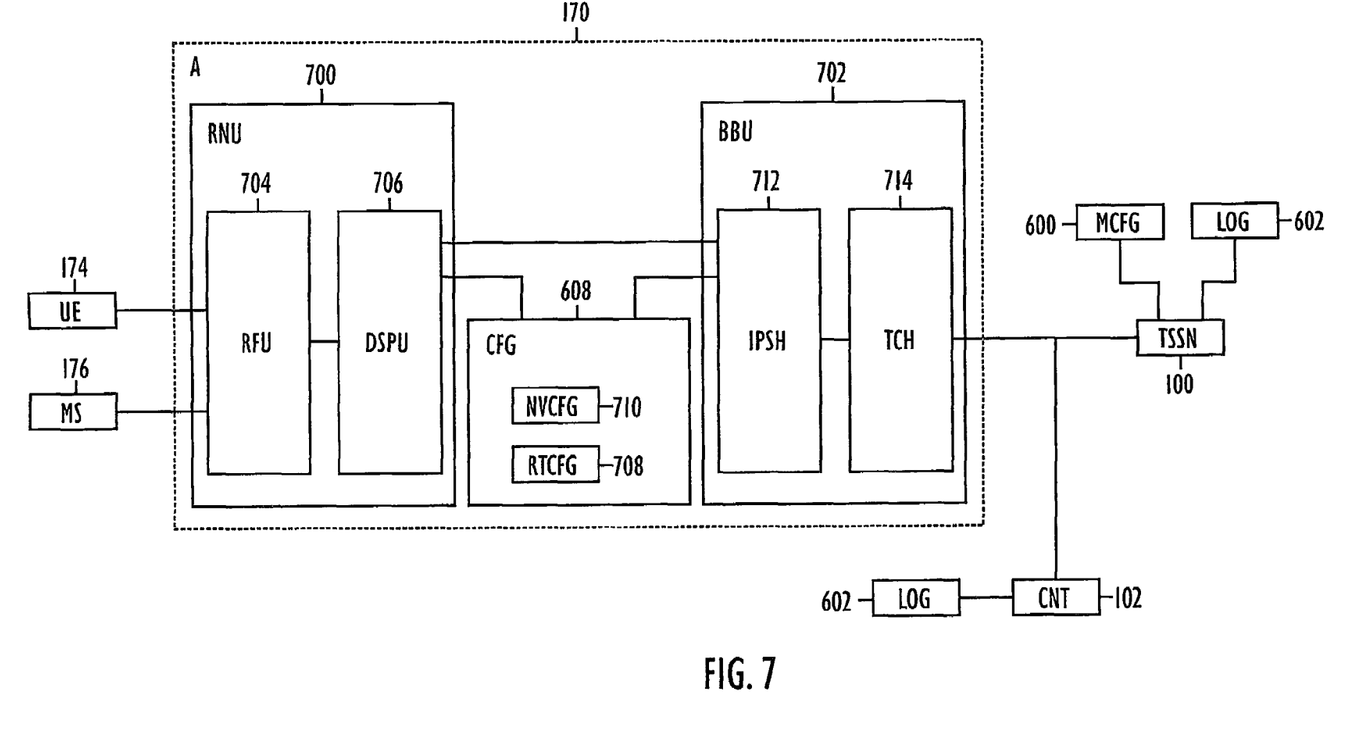
FIG. 7 is a simplified block diagram of the structure of an adapter.

Next, the structure of the adapter 170 will be described with reference to FIG. 7. The adapter 170 comprises a radio network unit 700, a telecommunication network unit 702, and a configuration unit 608.

The radio network unit 700 communicates with the subscriber terminal 174, 176 in accordance with the configuration it obtained from the configuration unit 608. The radio network unit 700 comprises an actual radio unit 704 and a processing unit 706 for controlling its operation. The processing unit 706 reads the radio network configuration used in each particular case from the configuration unit 608 and modifies the operation of the radio unit 704 accordingly. During the use of the subscriber terminal 174, 176, the radio unit 704 receives data from the subscriber terminals 174, 176, which it forwards to the processing unit 706. The processing unit 706 interprets the obtained data and uses it to either adjust the radio unit 704 or to transmit the data further to the telecommunication network unit 702. When data arrives from the telecommunication network unit 702, it is forwarded via the radio unit 704 to the subscriber terminal 174, 176.

The telecommunication network unit 702 is composed of a protocol unit 712 and an information network unit 714. The information network unit 714 communicates with the telecommunication network used, such as Ethernet, and via it with external devices, the simulator 100 and the control computer 102. The protocol unit 712 uses the information network unit 714 for communication with said external devices using a higher-level protocol, for instance the Internet protocol. When the protocol unit 712 obtains configuration data from the control computer 102, it is directed further to the configuration data. When the protocol unit 712 obtains user data from the simulator 100, it is directed further to the radio network unit 700. When the protocol unit 712 obtains user data from the radio network unit 700, it is directed further to the simulator 100.

The configuration unit 608 comprises a permanent memory 710 for storing configuration data, and a run-time memory 708. If the entire configuration is in the permanent memory 710, the radio network unit 700 and the telecommunication network unit 702 are configured based on this data upon start-up. If the permanent memory 710 only contains part of the configuration, the rest of the configuration is retrieved based on this information, upon start-up, from the storage 600 in association with the simulator 100 to the runtime memory 708, after which the radio network unit 700 and the telecommunication network unit 702 are configured based on this information. The configuration is altered with the control computer 102 and it is stored either in the permanent storage 710 or in the data storage 600. Event data 602 generated from the operation is stored in a data storage in the simulator 100 and/or in a data storage in the control computer 102.

Figure 8:
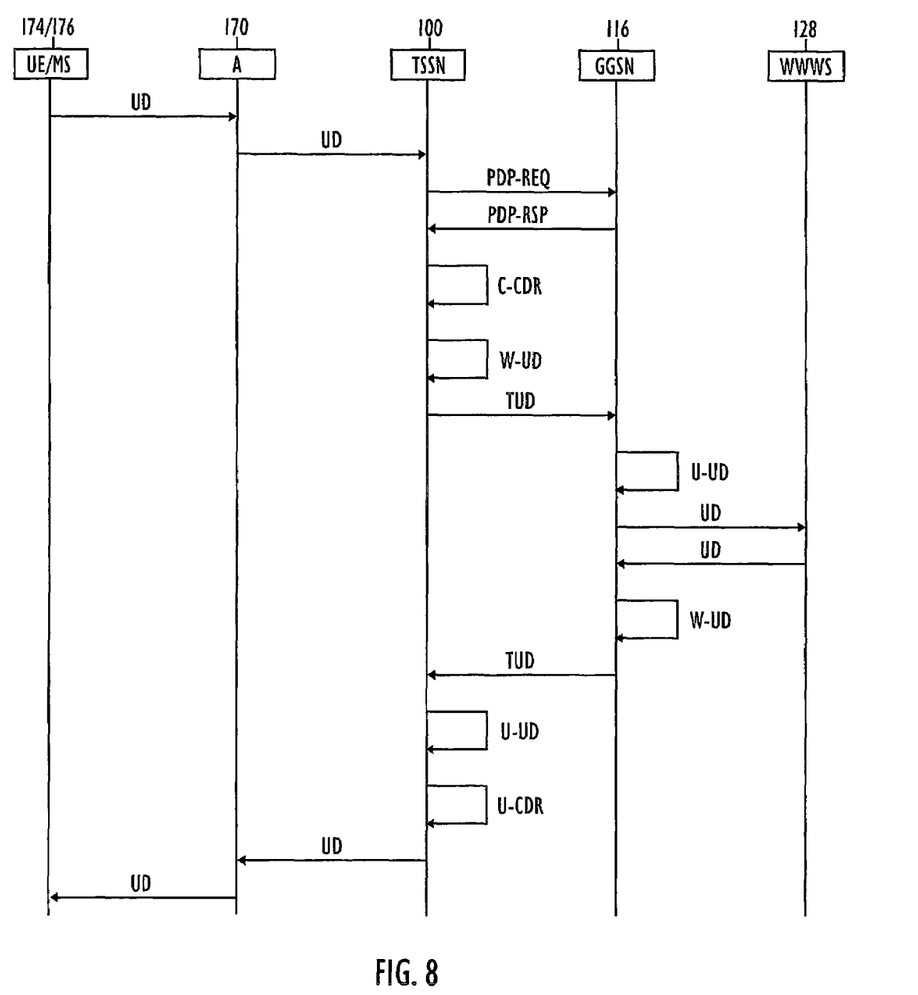
FIG. 8 is a simplified signal sequence diagram illustrating the operation of the device in testing services, a subscriber terminal being connected to the device with an adapter.

FIG. 8, a simplified signal sequence diagram illustrating the operation of the simulator 100 in testing services, is studied next, the subscriber terminal 174, 176 being connected with the adapter 170 to the simulator 100. The subscriber terminal 174, 176 transmits the user data UD to the adapter 170 using the air interface. The adapter 170 converts the user data into packet-form data and transmits the packet-form user data UD over the maintenance network to the simulator 100. When the first user data packet arrives at the simulator 100, the simulator 100 transmits a packet-form data transfer request PDP-REQ to the gateway GPRS support node 116. The gateway GPRS support node 116 responds with a packet-form data transfer request response PDP-RSP, whereupon the simulator 100 generates a billing record C-CDR from the established connection. The simulator 100 then encapsulates the user data W-UD into a suitable protocol form and transmits it along a created data tunnel TUD to the gateway GPRS support node 116. The gateway GPRS support node 116 performs decapsulation U-UD and directs the user data UD via the correct access point over the serving network and the Internet to the content server 128. The content server 128 transmits a response UD to the gateway GPRS support node 116, which encapsulates the user data W-UD into a suitable protocol form and transmits it via the created data tunnel TUD to the simulator 100. The simulator 100 performs decapsulation U-UD and updates the billing record U-CDR based on the information transferred. The simulator 100 then transmits the obtained response UD to the adapter 170, which converts the user data into a format used by the air interface and transmits the user data UD to the terminal 174/176 utilizing the air interface.

Figure 9:
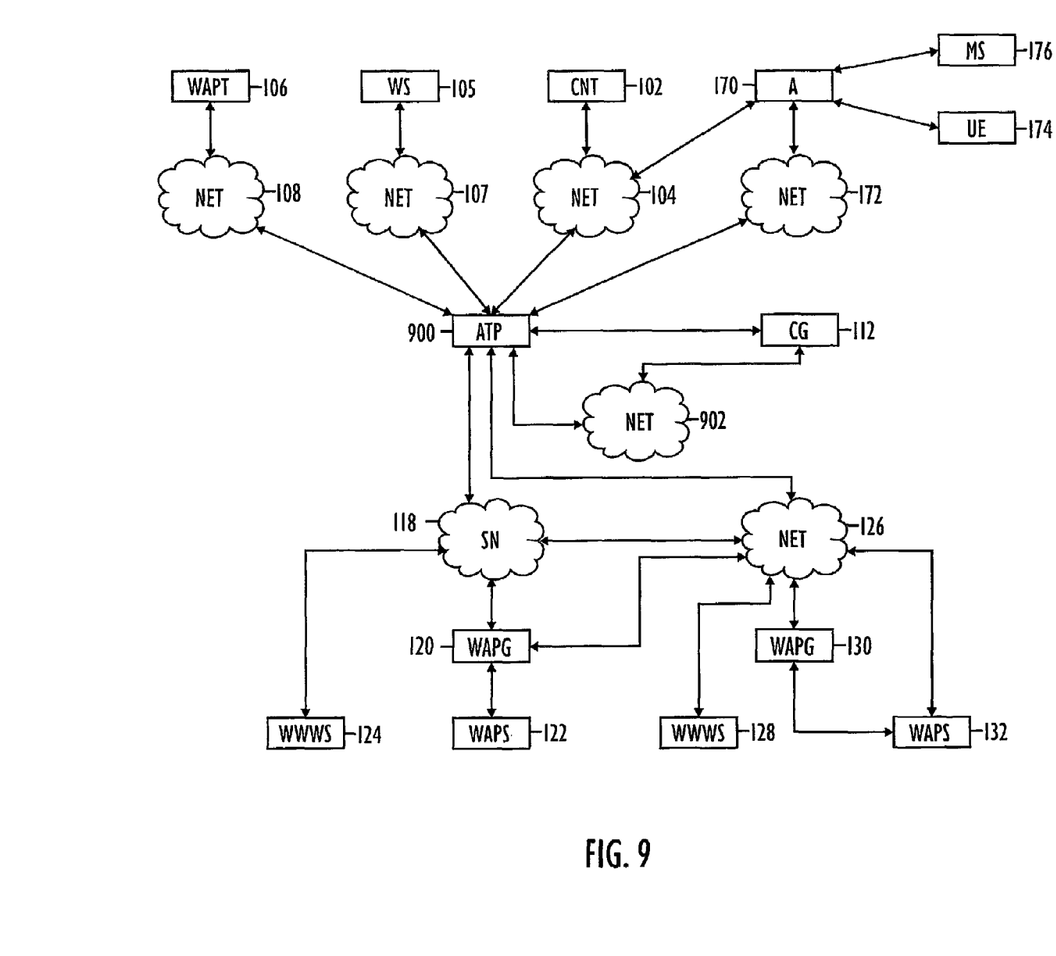
FIG. 9 shows a device including a gateway GPRS support node simulator in addition to a serving GPRS support node simulator.

In an embodiment, the device for testing a packet-switched cellular radio network comprises, in addition to the serving node simulator, a gateway GPRS support node simulator, via which the device can be connected to the service network 118. FIG. 9 shows this embodiment. In FIG. 9, the abbreviation ATP (Application Testing Platform) is used for such a simulator 900, since it is especially well suitable for testing applications and services intended for subscriber terminals 174, 176. The addition of a gateway GPRS support node simulator results in a significant change in the operation of the device. The simulator 100 simulates a given part of the data transmission network comprised by a radio system, whereas the simulator 900 now simulates the entire data transmission network of the radio system. In this case, the simulator 900 may replace a wireless packet-switched network (e.g. UMTS or GPRS) by operating in such a manner that the simulation program 106 of the wireless subscriber terminal, or the subscriber terminal 174, 176, is connected, via the adapter 170, through the simulator 900 to services 122, 124, 128, 132 provided behind the service network 118 and/or on the Internet 126.

Figure 10:
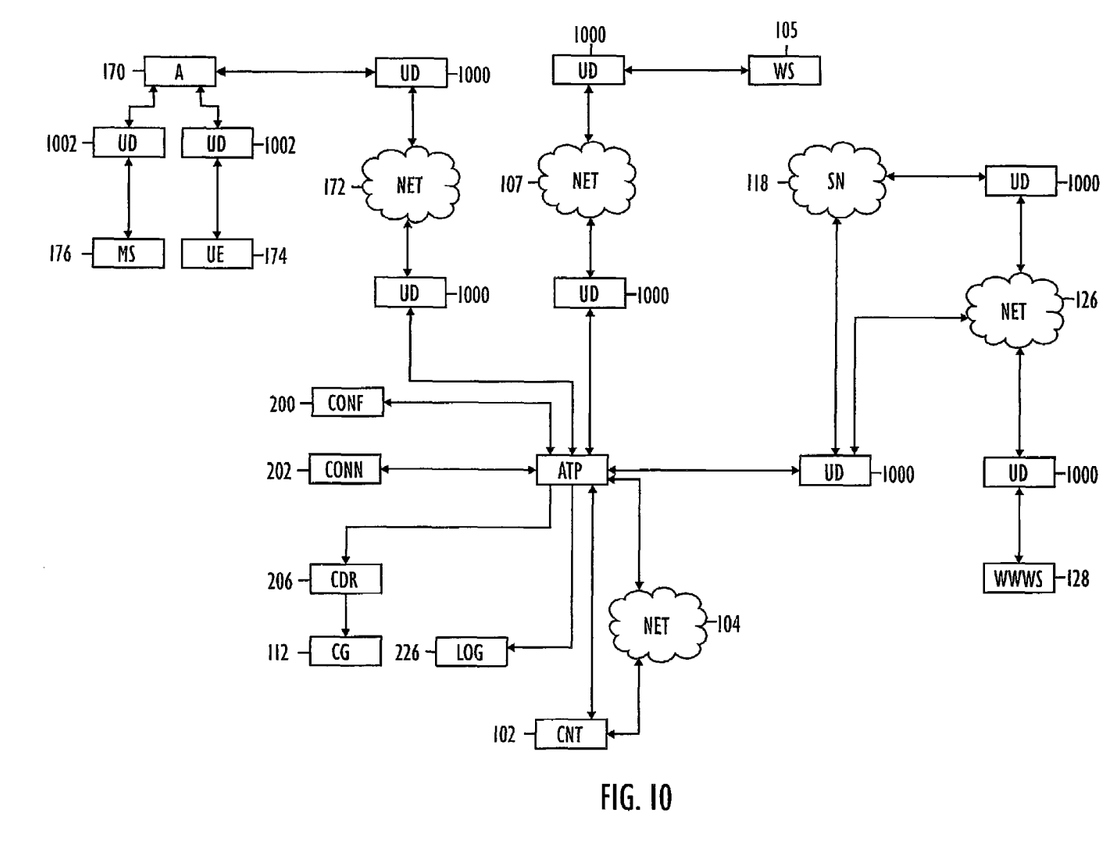
FIG. 10 shows the external interfaces and operation of the device of FIG. 9.

The external interfaces and operation of the device of FIG. 9 will be described next with reference to FIG. 10. The simulator 900 is configured using the control computer 102. The configuration data is stored in the configuration data storage 200. The configuration data is loaded from the configuration data storage 200 upon start-up of the simulator 900. Connection data is generated from the connections set up through the simulator 900 and stored in the connection data storage 202. Billing records 206 are generated from all user data 1000 passing through the simulator 900 and transmitted to the billing gateway 112. Event data 226 is stored for the entire operation of the simulator 900.

The workstation 105 transmits the packet-form user data 1000 over the maintenance network 107 to the simulator 900. The simulator 900 transmits the packet-form user data 1000 over the serving network 118 and the Internet 126 to the content server 128. The content server 128 transmits a response to the simulator 900, which transmits the obtained response to the workstation 105.

The terminal 174, 176 transmits the user data 1002 using the air interface to the adapter 170, which converts the user data into packet-form data and transmits the packet-form user data 1000 over the maintenance network 172 to the simulator 900. The simulator 900 transmits the packet-form user data 1000 over the serving network 118 and the Internet 126 to the content server 128. The content server 128 transmits a response to the simulator 900, which transmits the obtained response to the adapter 170, which converts the user data 1000 into a form used by the air interface and transmits the user data 1002 to the terminal 174, 176 using the air interface.

Figure 11:
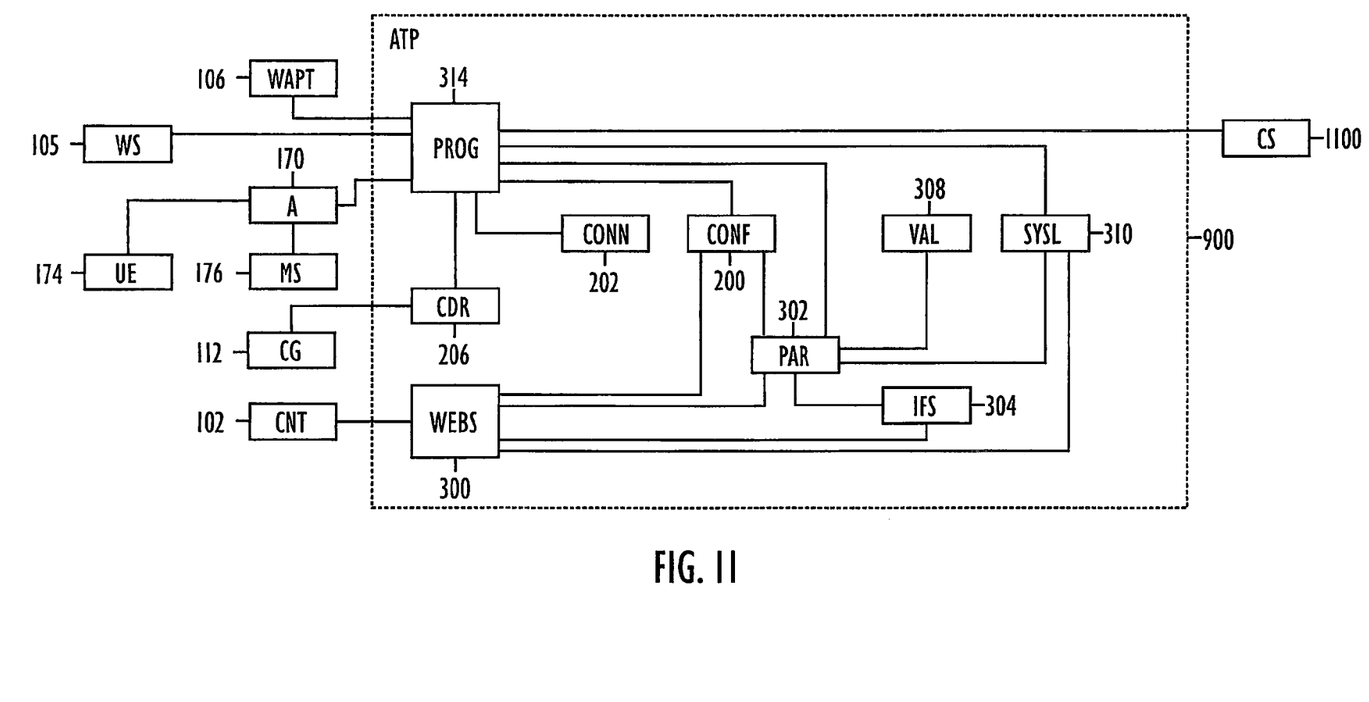
FIG. 11 shows the internal structure and operation of the device of FIG. 9.

The internal structure and operation of the device of FIG. 9 is described next with reference to FIG. 11. The operation of the simulator 900 is controlled by the control computer 102, which is used to set up a connection to the internal www server 300. The internal www server 300 retrieves the basic data required for controlling the operation from the interface record 304 and the operating instructions data storage 200. When the internal www server 300 has retrieved the data required for controlling the operation, the control computer 102 is able to change the data accordingly or create new control records for controlling the operation of the simulator 900. The basic data from the interface record 304 and the operating instructions data storage 200 required for controlling the operation remain in the possession of the internal www server 300 at all times, and is not stored in the control computer 102. However, the control computer 102 can be used to view, edit and create control data for controlling the operation. Once the desired amendments are made and they are to be stored, the internal www server 300 forwards the control data to an internal control data assembler 302, which checks that the new control data is in the correct format by using a control data checker 308. If the control data checker 308 detects an error in the control data, information thereon is returned to the control computer 102. After checking the control data, the control data assembler 302 stores the control data in the operating instructions storage 200. The control data computer 102 is used to select and activate the active control data for controlling the operation of the simulator 900. The internal www server 300 transfers the selection of the control computer 102 to the control data assembler 302, which requests the simulator 900 to restart and take into use the desired active control data. The simulator 900 generates billing data records 206 from the traffic passing through it, which are delivered to the billing gateway 112 along the Ga interface. Event data are collected from the real-time core 314, the internal www server 300 and the control data assembler 302, and stored in the event data storage 310. The gateway GPRS support node simulator can be implemented in the above-described manner for instance as a process/processes. The real-time core 314 can be connected in the manner described to the service network and the content server 1100, for instance to the servers 122, 124, 128 and 132 of FIG. 1. The real-time core 314 stores connection data in the connection data storage 202 about all connections set up through the simulator 900.

Figure 12:
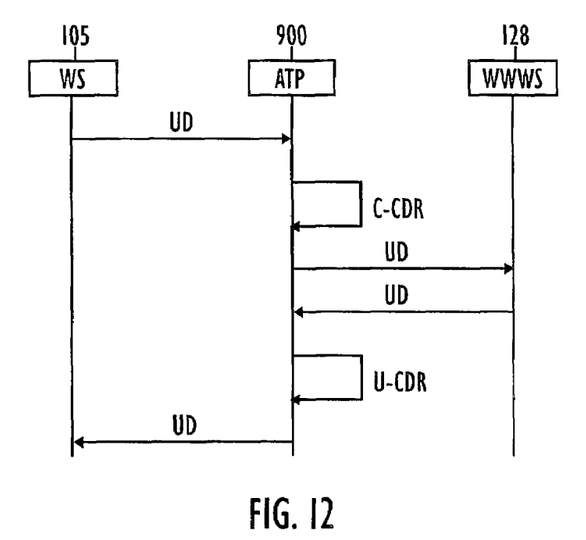
FIG. 12 shows the operation of the device of FIG. 9 in testing services.

The operation of the device of FIG. 9 in testing services will be described next with reference to FIG. 12. The workstation 105 transmits the packet-form user data UD over the maintenance network to the simulator 900. Upon arrival of the first user data packet at the simulator 900, the simulator 900 generates a billing record C-CDR from the established connection. The simulator 900 then transmits a user data packet UD via the correct access point over the serving network and the Internet to the content server 128. The content server 128 transmits a response UD to the simulator 900. The simulator 900 updates the billing record U-CDR based on the data transferred. The simulator 900 then transmits the obtained response UD to the workstation 105.

Figure 13:
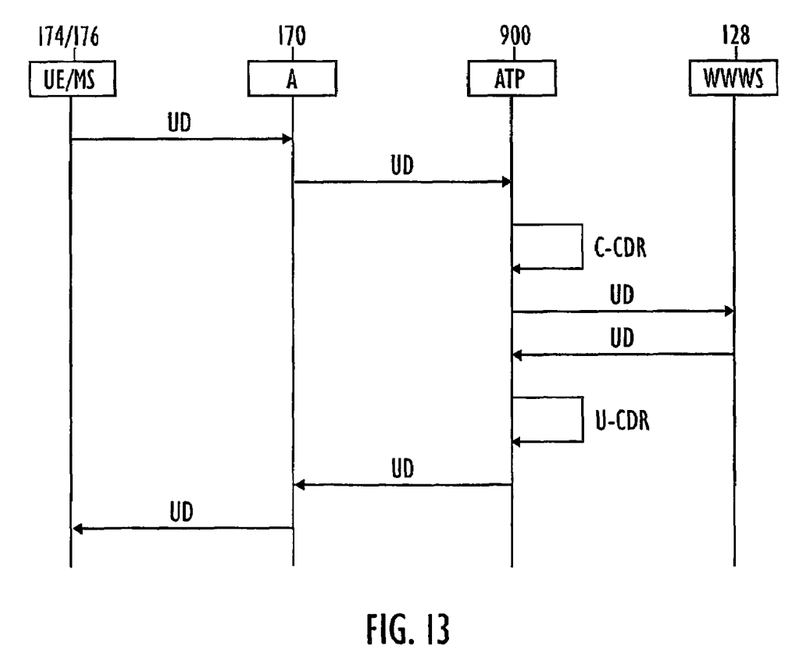
FIG. 13 shows the operation of the device of FIG. 9 in testing services, a subscriber terminal being connected to the device with an adapter.

As was mentioned above, a subscriber terminal 174, 176 can be connected to the simulator 900 of FIG. 9 via the adapter 170 for testing services. FIG. 13 shows the signal sequence of such a case when services are tested. The subscriber terminal 174, 176 transmits the user data UD to the adapter 170 using the air interface. The adapter 170 converts the user data into packet-form data and transmits the packet-form user data UD over the maintenance network to the simulator 900. Upon arrival of the first user data packet at the simulator 900, a billing record C-CDR is generated in the simulator 900 from the established connection. The simulator 900 then transmits the user data packet UD via the correct access point over the serving network and the Internet to the content server 128. The content server 128 transmits a response UD to the simulator 900. The simulator 900 updates the billing record U-CDR based on the transmitted data. The simulator 900 then transmits the obtained response UD to the adapter 170, which converts the user data into the form used by the air interface and transmits the user data UD to the subscriber terminal 174, 176 using the air interface.

Although the invention is described above with reference to the example according to the accompanying drawings, it is apparent that the invention is not limited thereto, but can be modified in a variety of ways within the scope of the inventive idea disclosed in the attached claims.

The invention claimed is:

1. A device for testing a packet-switched cellular radio network, the device comprising a network traffic simulator for traffic in a radio access network, and the device being configured to be connected to a control computer for giving commands to the device,
   wherein the device further comprises
   a serving general packet radio service GPRS support node simulator for a packet-switched data service, the simulator being configured to be connected to a gateway GPRS support node for coupling the device to a service network
   wherein for testing packet-switched services the device is configured to be connected to a test computer, in which a user interface of a service is run on a given platform,
   wherein the network traffic simulator is configured to generate billing data records from traffic caused by the packet-switched service.

2. A device as claimed in claim 1, wherein the network traffic simulator is configured to simulate the operation of at least one of the following: a subscriber terminal, a user device, a base station, a node B, a base station controller, a radio network controller, a mobile switching centre, a visitor location register.

3. A device as claimed in claim 1, wherein the device is configured to enable the connection of the test computer to the device via at least one of the following: the Internet, a private network, a virtual private network.

4. A device as claimed in claim 1, wherein the platform is a wireless terminal simulator.

5. A device as claimed in claim 1, wherein the network traffic simulator is configured to enable the transfer of billing data records to a billing gateway connectable to the device.

6. A device as claimed in claim 1, wherein the network traffic simulator is configured to simulate the effect of various interference and malfunction in a radio channel on traffic caused by the packet-switched service.

7. A device as claimed in claim 1, wherein the network traffic simulator is configured to simulate the effect of a change in radio channel data transfer capacity on traffic caused by the packet-switched service.

8. A device as claimed in claim 1, wherein, for testing packet-switched services, the device is configured to enable the connection of a content server to the device via a serving network.

9. A device as claimed in claim 8, wherein the content server is a content server using a wireless application protocol.

10. A device as claimed in claim 8, wherein the content server is a World Wide Web server.

11. A device as claimed in claim 8, wherein the content server is connectable to the serving network via at least one of the following: the Internet, a private network, a virtual private network.

12. A device as claimed in claim 1, wherein the device is configured to enable the connection of a name server to the device for testing packet-switched services.

13. A device as claimed in claim 1, wherein the device is configured to enable the connection of the control computer to the device via at least one of the following: the Internet, a private network, a virtual private network.

14. A device as claimed in claim 1, wherein the device also comprises a gateway GPRS support node, via which the device is connectable to the service network.

15. A device for testing a packet-switched cellular radio network, the device comprising a network traffic simulator for traffic in a radio access network, and the device being configured to be connected to a control computer for giving commands to the device, wherein the device further comprises a serving general packet radio service GPRS support node simulator for a packet-switched data service, the simulator being configured to be connected to a gateway GPRS support node for coupling the device to a service network, wherein, for testing packet-switched applications and services, the device is configured to be connected to a subscriber terminal, wherein a user interface of an application or a service is run on a given platform, via an adapter, the adapter comprising, for communication with the subscriber terminal, a radio network unit implementing a radio interface and a telecommunication network unit for communication with the device.

16. A device as claimed in claim 15, wherein the adapter is connectable to the device via at least one of the following: the Internet, a private network, a virtual private network.

* * * * *